United States Patent
Schrattenberger et al.

(10) Patent No.: US 11,905,863 B2
(45) Date of Patent: Feb. 20, 2024

(54) MEDIA CHANNEL ASSEMBLY FOR AN INTERNAL COMBUSTION ENGINE, INTERNAL COMBUSTION ENGINE HAVING A MEDIA CHANNEL ASSEMBLY, MOTOR VEHICLE HAVING AN INTERNAL COMBUSTION ENGINE AND METHOD FOR PRODUCING A MEDIA CHANNEL ASSEMBLY

(71) Applicant: Bayerische Motoren Werke Aktiengesellschaft, Munich (DE)

(72) Inventors: Andreas Schrattenberger, Munich (DE); Ferdinand Weidinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/793,445

(22) PCT Filed: Mar. 2, 2021

(86) PCT No.: PCT/EP2021/055112
§ 371 (c)(1),
(2) Date: Jul. 18, 2022

(87) PCT Pub. No.: WO2021/190871
PCT Pub. Date: Sep. 30, 2021

(65) Prior Publication Data
US 2023/0044906 A1 Feb. 9, 2023

(30) Foreign Application Priority Data
Mar. 26, 2020 (DE) .................... 10 2020 108 331.9

(51) Int. Cl.
*F01M 11/02* (2006.01)
*B29C 45/17* (2006.01)
*B29L 31/00* (2006.01)

(52) U.S. Cl.
CPC ......... *F01M 11/02* (2013.01); *B29C 45/1711* (2013.01); *B29C 2045/1707* (2013.01);
(Continued)

(58) Field of Classification Search
CPC .............. F01M 11/02; F01M 2011/026; B29C 45/1711; B29C 2045/1707; B29C 2045/1724; B29L 2031/749
See application file for complete search history.

(56) References Cited

U.S. PATENT DOCUMENTS

| 4,655,480 | A | * | 4/1987 | Thalmann | ......... B29C 66/52241 |
| | | | | | 285/21.2 |
| 2002/0020385 | A1 | * | 2/2002 | Stromsky | ................ F02B 75/22 |
| | | | | | 123/196 R |

(Continued)

FOREIGN PATENT DOCUMENTS

| DE | 8521528 U1 | 9/1985 |
| DE | 10 2009 052 471 A1 | 5/2010 |

(Continued)

OTHER PUBLICATIONS

International Search Report (PCT/ISA/210) issued in PCT Application No. PCT/EP2021/055112 dated May 28, 2021 with English translation (six (6) pages).

(Continued)

*Primary Examiner* — Syed O Hasan
(74) *Attorney, Agent, or Firm* — Crowell & Moring LLP

(57) ABSTRACT

A media channel assembly for an internal combustion engine includes at least one distribution channel for distributing a medium to various components of the internal (Continued)

combustion engine, and at least one supply channel, which is coupled to the distribution channel by way of at least one media passage opening. At least a wall region of the distribution channel lying opposite the media passage opening is curved, at least in parts, toward the media passage opening. An internal combustion engine includes such a media channel assembly, and a motor vehicle includes such an internal combustion engine.

9 Claims, 2 Drawing Sheets

(52) U.S. Cl.
CPC . *B29C 2045/1724* (2013.01); *B29L 2031/749* (2013.01); *F01M 2011/026* (2013.01)

(56) References Cited

U.S. PATENT DOCUMENTS

| | | | | |
|---|---|---|---|---|
| 2003/0101960 | A1* | 6/2003 | Tsuchiya | B63H 21/24 |
| | | | | 123/196 R |
| 2004/0157511 | A1* | 8/2004 | Hikosaka | B63H 20/002 |
| | | | | 440/88 L |
| 2006/0096567 | A1 | 5/2006 | Henkel | |
| 2017/0074205 | A1 | 3/2017 | Maki et al. | |

FOREIGN PATENT DOCUMENTS

| | | |
|---|---|---|
| DE | 10 2016 116 339 A1 | 3/2017 |
| EP | 0 484 312 A1 | 5/1992 |
| FR | 2 866 386 A1 | 8/2005 |
| WO | WO 2004/048765 A1 | 6/2004 |

OTHER PUBLICATIONS

German-language Written Opinion (PCT/ISA/237) issued in PCT Application No. PCT/EP2021/055112 dated May 28, 2021 (six (6) pages).

German-language Office Action issued in German Application No. 210 2020 108 331.9 dated Jan. 29, 2021 (five (5) pages).

Radig G., "Multifunktionales Kunststoffmodul auf engstem Raum" Kunststoffe, Carl Hanser Verlag, Munchen, DE, No. 11, pp. 86-88, ISSN: 0023-5563, XP001525759; dated Nov. 1, 2010 (four (4) pages).

Brunswick A. et al. "Herstellung Medienfuehrender Leitungen" Gasinjektionstechnik, XX, XX, Apr. 1, 2003, pp. 185-200 XP009015088 (16 pages).

Chinese-language Office Action issued in Chinese Application No. 202180009103.2 dated Oct. 27, 2023 with English translation (12 pages).

* cited by examiner

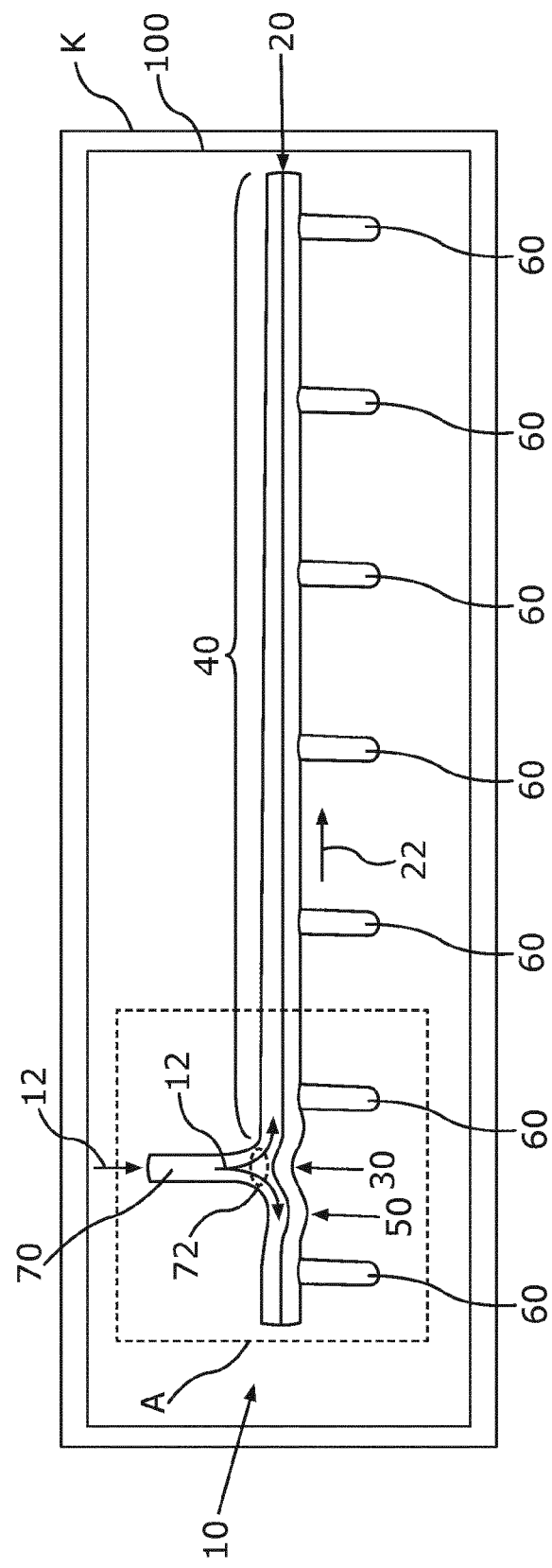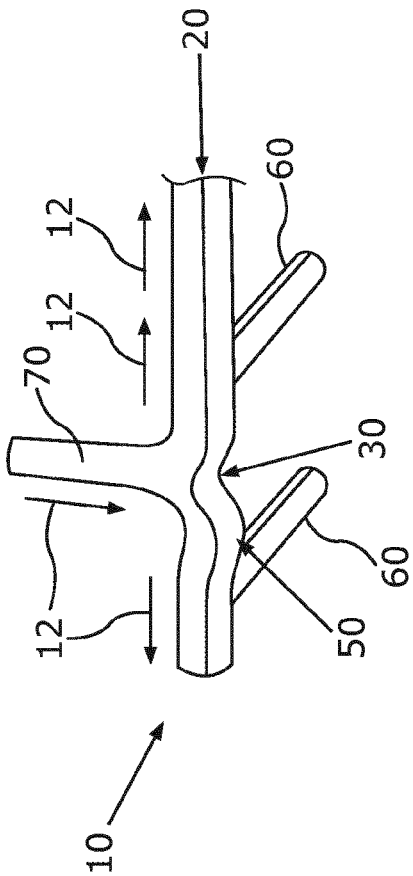

MEDIA CHANNEL ASSEMBLY FOR AN INTERNAL COMBUSTION ENGINE, INTERNAL COMBUSTION ENGINE HAVING A MEDIA CHANNEL ASSEMBLY, MOTOR VEHICLE HAVING AN INTERNAL COMBUSTION ENGINE AND METHOD FOR PRODUCING A MEDIA CHANNEL ASSEMBLY

BACKGROUND AND SUMMARY

The invention relates to a media channel assembly for an internal combustion engine, having at least one distributor channel, which serves for distributing a medium to various components of the internal combustion engine, and having at least one inflow channel, which is coupled to the distributor channel via at least one media passage opening. Further aspects of the invention relate to an internal combustion engine having a media channel assembly, to a motor vehicle having an internal combustion engine, and to a method for producing a media channel assembly.

In order to realize the highest possible efficiency during the operation of an internal combustion engine, various approaches are adopted. These include for example measures for reducing friction losses occurring during the operation of the internal combustion engine and setting of auxiliary units, such as for example an oil pump, according to requirement, to name just a few examples.

It is an object of the invention to provide a media channel assembly, an internal combustion engine and a motor vehicle of the type mentioned in the introduction that can be operated with improved efficiency. It is also an object of the invention to provide a method for producing a media channel assembly.

These objects are achieved by a media channel assembly, by an internal combustion engine, by a motor vehicle, and by a method, in accordance with the independent claims. Advantageous configurations with expedient refinements of the invention are specified in the dependent claims.

A first aspect of the invention relates to a media channel assembly for an internal combustion engine, having at least one distributor channel, which serves for distributing a medium to various components of the internal combustion engine, and having at least one inflow channel, which is coupled to the distributor channel via at least one media passage opening. The various components may for example be respective crankshaft bearings or a cylinder head of the internal combustion engine, to name just a few examples.

According to the invention, it is provided that at least one wall region, situated opposite the media passage opening, of the distributor channel is, at least regionally, curved toward the media passage opening. In other words, it is thus the case that the wall region situated opposite the media passage opening is curved in the direction of the media passage opening. This is advantageous since such a curvature of the wall region in the direction of the media passage opening makes it possible to effectively avoid a situation in which medium flowing into the distributor channel from the inflow channel via the media discharge opening impinges on the wall region almost perpendicularly, whereby increased pressure losses and flow resistances would occur during a transfer of flow of the medium from the inflow channel into the distributor channel. Instead, with the aid of the wall region curved in the direction of the media passage opening, it is possible to realize a diversion of the medium within the distributor channel that particularly is favorable in terms of flow and accordingly has low pressure losses, whereby, in comparison with conventional channel assemblys, an improvement in efficiency can ultimately be achieved.

In an advantageous refinement of the invention, it is provided that at least one second wall region, which adjoins the wall region and is situated opposite the media passage opening, is curved oppositely in relation to the media passage opening. In other words, it is thus the case that the second wall region is curved in the opposite direction in relation to the media passage opening, that is to say is, as it were, curved away from the media passage opening. The second wall region may therefore have a second curvature which may be curved in the opposite direction in relation to the media passage opening. This is advantageous since the wall region and the second wall region can thereby jointly form an undulating wall section of the distributor channel, wherein the undulating wall section can give rise to guidance of the medium that is particularly favorable in terms of flow.

In a further advantageous refinement of the invention, it is provided that the distributor channel has a narrowing region with an opening cross section which narrows in the direction of a channel end which is spaced apart from the wall region. This is advantageous since, by virtue of the narrowing opening cross section, a more even distribution of the pressure of the medium flowing within the narrowing region can be achieved.

A further advantageous refinement of the invention provides that the media channel assembly comprises a plurality of media outflow channels which are spaced apart from one another, are distributed along the narrowing region and are able to be supplied with the medium via the distributor channel. This is advantageous since, owing to the narrowing cross section and to the media outflow channels distributed along the narrowing region, it is possible for at least in each case approximately equal pressures of the medium in the respective media outflow channels to be set.

According to a further advantageous refinement of the invention, the media channel assembly is, at least regionally, formed from plastic. This is advantageous since the media channel assembly formed at least regionally, preferably completely, from plastic consequently—by contrast to a possible configuration of the media channel assembly composed of metal—offers particularly good thermal insulation, so that an intense change in temperature of the medium when it flows through the media channel assembly can be avoided. Furthermore, plastic has a particularly low weight.

In a further advantageous refinement of the invention, the media channel assembly is in the form of an oil gallery. This is advantageous since, although oil, as medium flowing through the media channel assembly in the form of an oil gallery, has a particularly temperature-dependent viscosity, owing to the curved wall region of the distributor channel, a relatively low-resistance transport of the medium within the media channel assembly can be achieved even at high viscosity and correspondingly low temperature of the medium in the form of oil. In this respect, the media channel assembly is suitable particularly for use as an oil gallery.

A second aspect of the invention relates to an internal combustion engine having a media channel assembly according to the first aspect of the invention. The media channel assembly contributes to the internal combustion engine being able to be operated with improved efficiency.

A third aspect of the invention relates to a motor vehicle having an internal combustion engine according to the second aspect of the invention. Such a motor vehicle, which comprises an internal combustion engine having a media channel assembly according to the first aspect of the invention, can be operated with improved efficiency.

A fourth aspect of the invention relates to a method for producing a media channel assembly according to the first aspect of the invention, in which a liquid plastic is introduced into a cavity which provides shaping for the media channel assembly, and subsequently a liquid is pressed into the cavity and in this way a part of the liquid plastic is forced out of the cavity, whereby the part of the liquid plastic is separated from plastic remaining in the cavity, which forms the media channel assembly. By way of this method, the media channel can be provided with a contour which is particularly favorable in terms of flow. The forcing of the part of the liquid plastic out of the cavity with the aid of the liquid makes it possible to provide roundings, in particular edge roundings, that are favorable in terms of flow.

As a result of the pressing-in of the liquid, the plastic remaining in the cavity can be cooled and consequently solidify. The liquid can thus perform a dual function, namely force the part of the liquid plastic out of the cavity, on the one hand, and cool the remaining plastic in such a way that it hardens and in particular solidifies, on the other hand.

The preferred embodiments presented with reference to one of the aspects, and the advantages thereof, apply correspondingly to the in each case other aspects of the invention, and vice versa.

The features and feature combinations mentioned above in the description, and the features and feature combinations mentioned below in the description of the figures and/or shown only in the figures, may be used not only in the respectively specified combination but also in other combinations or individually without departing from the scope of the invention.

Further advantages, features and details of the invention emerge from the claims and from the following description of preferred embodiments and also on the basis of the drawings.

BRIEF DESCRIPTION OF THE DRAWINGS

FIG. 1 is a highly abstract illustration of a motor vehicle with an internal combustion engine which has a media channel assembly (shown in a schematic side view);

FIG. 2 is an enlarged illustration of a region A (bordered in FIG. 1) of the media channel assembly.

DETAILED DESCRIPTION OF THE DRAWINGS

Figure 3:
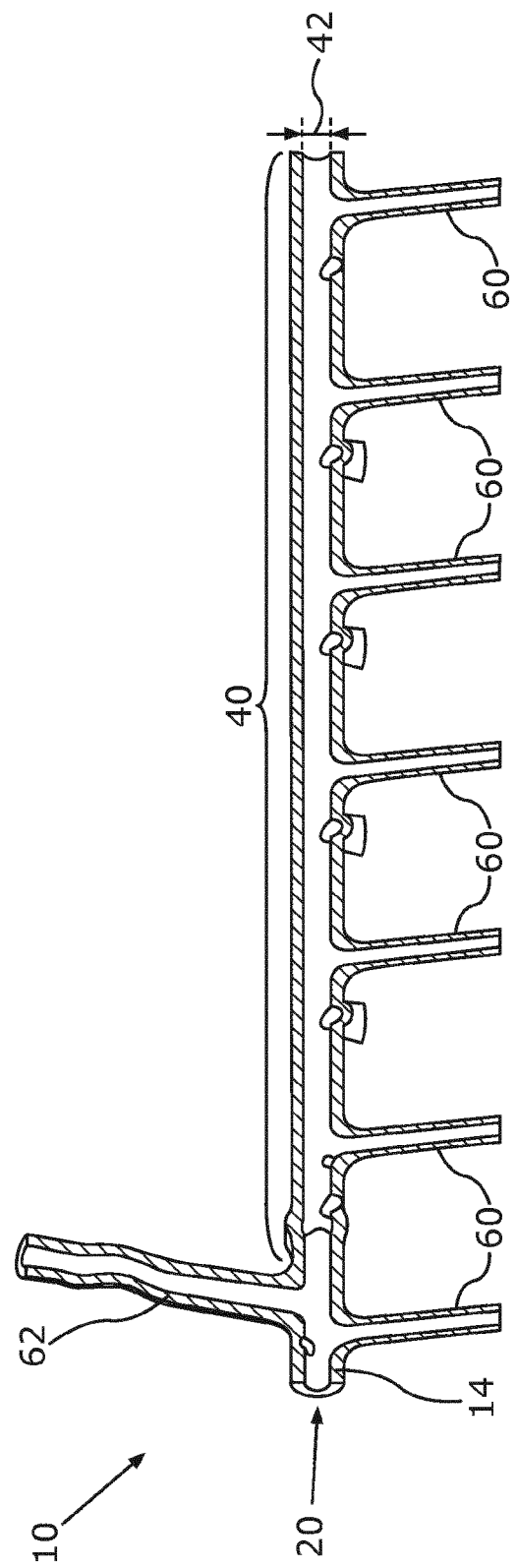
FIG. 3 is a schematic sectional illustration of the media channel assembly.

FIG. 1 shows a highly abstract illustration of a motor vehicle K with an internal combustion engine 100.

The internal combustion engine 100 comprises a media channel assembly 10, which is in the form of an oil gallery in the present case. The media channel assembly 10 thus serves for guiding a medium 12 (illustrated by respective arrows), which medium is oil, in particular engine oil, in the present case.

The media channel assembly 10 comprises a distributor channel 20, via which the medium 12 can be guided to various components, including for example crankshaft bearings of the internal combustion engine 100. For this purpose, the media channel assembly 10 comprises a plurality of media outflow channels 60 which are spaced apart from one another, wherein in each case one of the media outlet channels 60 serves for guiding the medium 12 (oil in this case) to in each case one of the components.

The media channel assembly 10 furthermore comprises an inflow channel 70, which is coupled to the distributor channel 20 via a media passage opening 72. The medium 12 can thus be introduced into the distributor channel 20 through the inflow channel 70 and via the media passage opening 72. The media passage opening 72 is indicated in FIG. 1 by a dashed line.

A wall region 30, situated opposite the media passage opening 72, of the distributor channel 20 is curved toward the media passage opening 72, as can be seen particularly clearly in FIG. 2, which shows an enlarged illustration of a region A that is bordered by dashed lines in FIG. 1. In other words, it is thus the case that the distributor channel 20 has a curvature which is associated with the wall region 30 and which faces toward the media passage opening 72, which curvature may also be referred to as first curvature.

A second wall region 50, which adjoins the wall region 30 and is situated opposite the media passage opening 72, is—by contrast to the (first) wall region 30—curved oppositely in relation to the media passage opening 72. In other words, it is thus the case that the distributor channel 20 has a curvature which is associated with the second wall region 50 and which faces away from the media passage opening 72, which curvature may also be referred to as second curvature.

The distributor channel 20 moreover comprises a narrowing region 40 with an opening cross section 42 which narrows in the direction 22 of a channel end which is spaced apart from the wall region 30. Here, the direction 22 is illustrated by a further arrow. Arranged distributed along the narrowing region 40 are the respective media outflow channels 60, which can be supplied with the medium 12 via the distributor channel 20.

In the present case, the media channel assembly 10 is formed completely from plastic 14, wherein respective wall thicknesses of a wall, formed from the plastic, of the media channel assembly 10 can be seen in FIG. 3. FIG. 3 moreover shows that the media channel assembly 10 comprises a rising channel 62 which can be supplied with the medium 12 via the distributor channel 20. The medium 12 can be guided via the rising channel 62 to a cylinder head (not shown in any more detail) as a further component of the internal combustion engine 100.

In a method for producing the media channel assembly 10, firstly liquid plastic can be introduced into a cavity (not shown in any more detail in the present case), which provides shaping for the media channel assembly 10. The cavity may for example be in the form of a cast component. Subsequently, a liquid, in particular water, is pressed into the cavity and is in this way, as it were, injected into the cavity. In this way, a part of the liquid plastic is displaced from and thus forced out of the cavity, whereby the part of the liquid plastic is separated from plastic 14 remaining in the cavity, which forms the media channel assembly 10. The remaining plastic 14 forms in this case a thermally insulating wall of the media channel assembly 10.

In summary, the present media channel assembly 10 makes possible guidance of the medium 12 (oil in this case) that particularly has low flow resistance and consequently is optimized in terms of pressure loss, particularly as the media channel assembly 10 is not only provided with the correspondingly curved wall regions 30, 50 but also has roundings and the narrowing region 40. The cavity may, for example, be in the form of and provided as a cast component into which the liquid plastic can be introduced. The pressing of the liquid into the cavity results in the surplus part of the liquid plastic being displaced from the cavity, wherein the plastic 14 remaining in the cavity provides thermally insulating action.

LIST OF REFERENCE SIGNS

- 10 Media channel assembly
- 12 Medium
- 14 Plastic
- 20 Distributor channel
- 22 Direction
- 30 Wall region
- 40 Narrowing region
- 42 Opening cross section
- 50 Second wall region
- 60 Media outflow channel
- 62 Rising channel
- 70 Inflow channel
- 72 Media passage opening
- 100 Internal combustion engine
- K Motor vehicle

The invention claimed is:

1. An oil channel assembly for an internal combustion engine, comprising: at least one distributor channel, which serves for distributing a medium to various components of the internal combustion engine; and at least one inflow channel, which is coupled to the distributor channel via at least one oil passage opening, wherein at least one first wall region, situated opposite the oil passage opening, of the distributor channel is, at least regionally, curved toward the oil passage opening, and wherein the medium flows through the oil passage opening from the inflow channel toward the first wall region and to the distributor channel.

2. The oil channel assembly according to claim 1, wherein at least one second wall region, which adjoins the first wall region and is situated opposite the oil passage opening, is curved oppositely in relation to the oil passage opening.

3. The oil channel assembly according to claim 1, wherein the distributor channel has a narrowing region with an opening cross section which narrows in a direction of a channel end which is spaced apart from the first wall region.

4. The oil channel assembly according 3, further comprising: a plurality of oil outflow channels which are spaced apart from one another and are distributed along the narrowing region, the plurality of oil outflow channels being capable of being supplied with the medium via the distributor channel.

5. The oil channel assembly according to claim 1, wherein the oil channel assembly is, at least regionally, formed from plastic.

6. The oil channel assembly according to claim 1, wherein the oil channel assembly is an oil gallery.

7. An internal combustion engine comprising an oil channel assembly according to claim 1.

8. A motor vehicle comprising an internal combustion engine according to claim 7.

9. A method for producing an oil channel assembly, comprising: introducing a liquid plastic into a cavity which shapes the oil channel assembly to have a distributor channel, which serves for distributing a medium to various components of the internal combustion engine, and an inflow channel coupled to the distributor channel via at least one oil passage opening, wherein a first wall region, situated opposite the oil passage opening, of the distributor channel is, at least regionally, curved toward the oil passage opening, and wherein the oil channel assembly is configured such that the medium flows through the oil passage opening from the inflow channel toward the first wall region and to the distributor channel; and subsequently pressing a liquid into the cavity so as to force a part of the liquid plastic out of the cavity, whereby the part of the liquid plastic is separated from plastic remaining in the cavity that forms the oil channel assembly.

* * * * *